Patented Feb. 7, 1928.

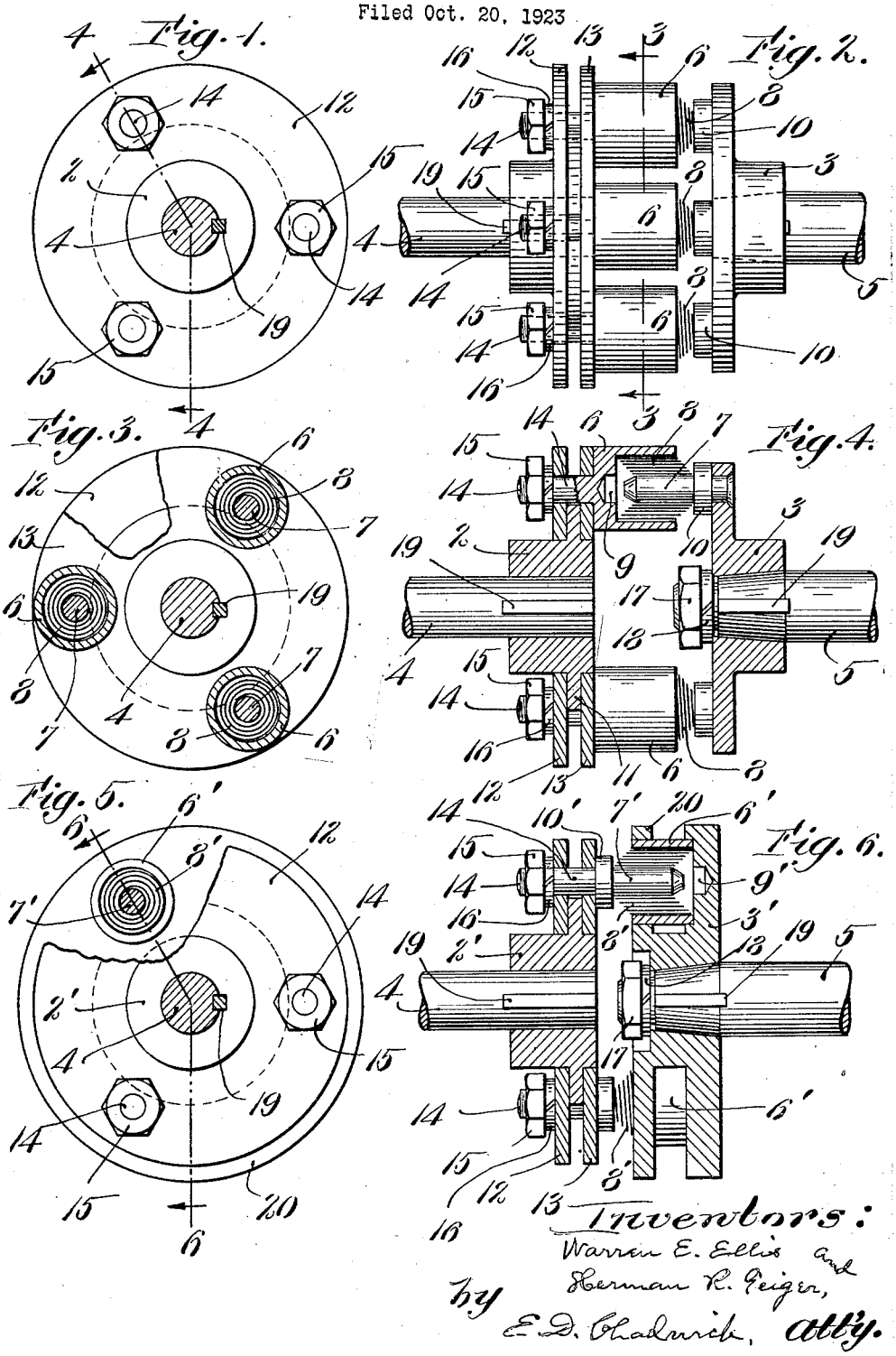

1,658,786

UNITED STATES PATENT OFFICE.

WARREN E. ELLIS, OF HAVERHILL, MASSACHUSETTS, AND HERMAN R. GEIGER, OF BRONXVILLE, NEW YORK; SAID ELLIS ASSIGNOR TO SAID GEIGER.

SHAFT COUPLING.

Application filed October 20, 1923. Serial No. 669,729.

Our invention relates to flexible couplings for connecting the adjacent ends of two shafts which are or may be slightly out of alignment with each other, and is particularly intended to provide an improved coupling for connecting the magneto shaft in an automobile to the power shaft that drives it. The features in which our invention resides, and the advantages resulting therefrom, are hereinafter explained in connection with the accompanying drawing, in which Figure 1 is a face view of one form of our coupling as preferably constructed;

Figure 2 is a side elevation of the same;

Figure 3 is a section on the line 3—3 in Figure 2;

Figure 4 is a section on the line 4—4 in Figure 1;

Figure 5 is a face view, partly broken away, showing a modified form of the coupling, and Figure 6 is a section on the line 6—6 in Figure 5.

The coupling illustrated in Figures 1-4 inclusive comprises two members 2 and 3, each of which is centrally mounted on and rigidly secured to the end portion of one or the other of the two shafts 4 and 5 to be coupled together, one or more spring supports 6 secured to one of said members, a like number of pins 7 secured to the other of said members, and springs 8 each interposed between one of the pins 7 and the corresponding spring support. In the specific construction illustrated there are three spring supports 6 separated by equal distances circumferentially and each having the form of a cylindrical cup within which the corresponding pin 7 is located, the central longitudinal axes of the cups and pins being parallel with those of the respective shafts which carry them and at equal distances therefrom. The interior of each cup is of greater diameter than the corresponding pin, so that an annular space is left between them for the reception of the corresponding spring 8, which consists of a closely coiled flat strip of metal and is preferably formed by coiling a strip of soft steel and then tempering it. Each spring makes a tight fit externally with its cup and internally with the inserted pin, and the arrangement is such that when the parts are assembled in operative relation a space is left between the free end of each pin and the bottom of the corresponding cup, as shown in Figure 4.

Preferably each spring 8 has a conical outer end which projects beyond its cup and the parts are so proportioned that when the coupling is connected to the shafts 4 and 5 each spring is slightly compressed endwise, so that when ever any pin 7 moves outward with respect to its cup 6, as occurs in the operation of the coupling as hereinafter described, the central portion of the spring follows the pin. The result is that there is no tendency to withdraw the pin from the spring or the spring from the cup and the operation of the coupling is rendered noiseless. We prefer also to provide in the bottom of each cup a recess 9 adapted to receive the end of the corresponding pin 7, so that the parts may be assembled by merely placing the springs in the cups and then forcing the pins inward against the endwise resistance of the springs until the latter abut at their inner ends against the bottoms of the cups and at their outer ends against shoulders 10 with which the pins 7 are provided. Another advantage of the construction just described is that the space left in the bottom of each cup may be utilized to hold a stiff lubricant if desired.

As thus constructed, the rotation of either shaft will evidently be transmitted to the other shaft through the cups, springs and pins above described, with only such lost motion as is necessary to bring the adjacent coils of the springs into actual contact with one another. Each pin, however, can tilt in any direction within its cup to an extent determined by the aggregate of the slight spaces necessarily left between the successive coils of the corresponding spring, and this capacity to tilt, in connection with the capacity of the pins to move endwise within the respective cups, provides for such relative movements of the coupling members 2 and 3 as result from misalignment of the shafts 4 and 5, thus giving to the coupling the required flexibility.

When the coupling is to be included in the driving connections of a magneto it is desirable to provide for angular adjustment of the shafts 4 and 5 in relation to each other in order that the magneto shaft may be properly timed with respect to the motor, and for this purpose we have devised the arrangement shown in Figures 2 and 4, in which 11 indicates a peripheral flange formed on the central hub of the coupling member 2, and 12 and 13 indicate two disks rotatably mounted on said hub on opposite sides of the flange 11. The cups 6 are secured to the disk 13, preferably by providing each cup with an integral stem 14 which passes through both disks beyond the flange 11, and the threaded free end of each stem 14 carries a clamping nut 15 with a spring washer 16 beneath it, whereby the disks may be clamped upon the flange. After the nuts 15 have been loosened either shaft may be turned with respect to the other until the desired adjustment is obtained, which is preserved by tightening the nuts.

The coupling members 2 and 3 may be secured to the respective shafts 4 and 5 in any suitable manner, but preferably one of the shafts, for example the shaft 5, has a tapered portion which fits a tapered socket in the coupling member 3 and has its end threaded to receive a nut 17 with a spring washer 18 beneath it, whereby the member 3 is clamped on the shaft, while the other shaft 4 has a cylindrical end portion which fits a cylindrical bore in the hub of the member 2, so that it can be withdrawn endwise therefrom if desired. Each shaft is provided with a key 19 by which it is prevented from turning within the corresponding coupling member.

In the modified form of coupling shown in Figures 5 and 6 the coupling member 2' carries the pins 7', which may be secured to the stems 14 already described, and the cups 6' consist of sections of tubing each passing through and supported at its outer end by a flange 20 formed on the coupling member 3', its inner end being located in a recess in said coupling member, which forms the bottom of the cup. In this case the recesses 9' are formed in the coupling member 3' and the springs 8' are reversed in position, so that their conical ends abut against the shoulders 10' on the pins 7'. Otherwise the construction is the same as that of the coupling shown in Figures 1–4 and the mode of operation is the same in each case.

Our coupling is not only simple and inexpensive in construction but also has the advantage that the transmission of power from one member to the other is effected wholly by means of metallic parts in positive engagement with one another, and it will be seen that this result is obtained by including in the power-transmitting elements a spring of such construction that it is substantially unyielding in the direction in which the power is transmitted but yields in other directions sufficiently to provide for the relative movements of the adjacent parts which result from misalignment of the two shafts. For this purpose we prefer to employ the closely-coiled springs above described, as they have ample capacity for endwise movement and operate with little frictional or other resistance, even though they are not lubricated, but it will be evident that springs otherwise constructed may be employed instead if desired, provided they have the functional capacity above described, and that the other details of construction of the coupling may be modified in various ways within the scope of our invention as hereinafter claimed.

We claim:—

1. A shaft coupling comprising two coupling members adapted to be secured respectively to the shafts to be coupled together, and a plurality of yielding connections between said members, each connection including a pin carried by one member, a spring support carried by the other member and an endwise compressible spring consisting of a closely coiled strip of metal interposed between the pin and the spring support and having a conical end which projects beyond the support to such an extent that the spring is under endwise compression in all relative positions of the coupling members, the axis of the pin, spring support and spring being substantially parallel with the axis of rotation of the coupling.

2. A shaft coupling comprising two coupling members adapted to be secured respectively to the shafts to be coupled together, and connections between said members comprising cup-shaped spring supports carried by one member, pins carried by the other member and each extending into one of the spring supports, and springs each interposed between one of the pins and the corresponding spring support and consisting of a closely-coiled strip of metal, the axes of the springs being substantially parallel with the axis of rotation of the coupling and each spring having a conical end projecting beyond its support when the spring is uncompressed in an endwise direction.

3. A shaft coupling comprising two coupling members adapted to be secured respectively to the shafts to be coupled together, and connections between said members comprising cup-shaped spring supports carried by one member and open at one end, springs each consisting of a closely-coiled strip of metal held in one of the spring supports and having a conical end projecting beyond the open end of the latter when the spring is uncompressed in an endwise direction, and pins carried by the other coupling member and each located within one of the springs, the axes of the springs being substantially parallel with the axis of rotation of the coupling and a space being provided for the reception of the free end of each pin when the corresponding spring is compressed endwise.

4. A shaft coupling comprising a coupling member adapted to be secured to one of the shafts to be coupled together, another coupling member having a hub adapted to be secured to the other shaft and provided with a peripheral flange, two discs rotatably mounted on the hub on opposite sides of its flange, and a plurality of yielding connections between the coupling members, each connection including a pin extending substantially parallel with the axis of rotation of the coupling, a spring support, a closely-coiled strip of metal interposed between them, and a stem passing through said discs beyond said flange and having a threaded outer end with a nut thereon, whereby the discs may be caused to exert a frictional grip on the flange in any relative position thereof.

Signed at Boston, Mass., this 18th day of October, 1923.

WARREN E. ELLIS.
HERMAN R. GEIGER.